United States Patent
Lewis

(10) Patent No.: US 10,984,116 B2
(45) Date of Patent: *Apr. 20, 2021

(54) SYSTEMS AND METHODS FOR DIGITAL CURRENCY OR CRYPTO CURRENCY STORAGE IN A MULTI-VENDOR CLOUD ENVIRONMENT

(71) Applicant: Paul Lewis, Asbury, NJ (US)

(72) Inventor: Paul Lewis, Asbury, NJ (US)

(73) Assignee: CALAMU TECHNOLOGIES CORPORATION, Asbury, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/261,720

(22) Filed: Jan. 30, 2019

(65) Prior Publication Data
US 2019/0156045 A1 May 23, 2019

Related U.S. Application Data

(63) Continuation-in-part of application No. 16/055,587, filed on Aug. 6, 2018, now abandoned, which is a
(Continued)

(51) Int. Cl.
*G06F 21/60* (2013.01)
*H04L 9/32* (2006.01)
(Continued)

(52) U.S. Cl.
CPC .......... *G06F 21/602* (2013.01); *G06F 3/067* (2013.01); *G06F 21/6218* (2013.01);
(Continued)

(58) Field of Classification Search
CPC .................. H04L 67/1097; G06F 3/067; G06F 2211/1028
See application file for complete search history.

(56) References Cited

U.S. PATENT DOCUMENTS

| 7,103,558 B1 | 9/2006 | Patton et al. |
| 7,574,579 B2 | 8/2009 | Gladwin et al. |

(Continued)

FOREIGN PATENT DOCUMENTS

| WO | 2013101085 A1 | 7/2013 |
| WO | 2016003969 A2 | 1/2016 |
| WO | 2018031342 A1 | 2/2018 |

OTHER PUBLICATIONS

International Search Report and Written Opinion dated Dec. 24, 2015 for International Application No. PCT/2015/038433.
(Continued)

*Primary Examiner* — Dao Q Ho
(74) *Attorney, Agent, or Firm* — Gearhart Law LLC; David Postolski, Esq.

(57) ABSTRACT

A cloud-based system for providing data security, the system having a processor which creates a source data file; wherein the source data file is split into one or more fragments; an encryption key associated with the one or more fragments; and wherein the one or more fragments are encrypted by the encryption key; a plurality of cloud storage providers; wherein the one or more fragments are distributed among the plurality of cloud storage providers whereby no single cloud storage provider possesses all of the one or more fragments; a pointer file which is created on a local computer; wherein the pointer file stores the location of the one or more fragments; and wherein the pointer file is accessed; the encryption key authenticates the plurality of cloud storage providers; the one or more fragments are transferred from the plurality of cloud storage providers to the local computer; and wherein the one or more fragments are reassembled; and the source data file is deleted.

9 Claims, 4 Drawing Sheets

Related U.S. Application Data continuation of application No. 15/226,237, filed on Aug. 2, 2016, now Pat. No. 10,043,017, which is a continuation-in-part of application No. 14/251,612, filed on Jun. 30, 2014, now Pat. No. 9,405,926.

(60) Provisional application No. 61/812,115, filed on Apr. 15, 2013.

(51) Int. Cl.
| | | |
|---|---|---|
| *H04L 9/08* | (2006.01) | |
| *H04L 9/14* | (2006.01) | |
| *G06F 3/06* | (2006.01) | |
| *H04L 29/06* | (2006.01) | |
| *G06F 21/62* | (2013.01) | |
| *H04L 29/08* | (2006.01) | |

(52) U.S. Cl.
CPC ............ *H04L 9/085* (2013.01); *H04L 9/0819* (2013.01); *H04L 9/0861* (2013.01); *H04L 9/0894* (2013.01); *H04L 9/14* (2013.01); *H04L 9/3226* (2013.01); *H04L 63/0428* (2013.01); *H04L 63/0435* (2013.01); *H04L 63/08* (2013.01); *H04L 63/083* (2013.01); *G06F 2221/2107* (2013.01); *H04L 67/1097* (2013.01); *H04L 2209/56* (2013.01); *H04L 2463/081* (2013.01)

(56) References Cited

U.S. PATENT DOCUMENTS

| | | |
|---|---|---|
| 9,405,926 B2 | 8/2016 | Lewis |
| 10,043,017 B2 | 8/2018 | Lewis |
| 2003/0084020 A1 | 5/2003 | Shu |
| 2003/0220985 A1 | 11/2003 | Kawamoto et al. |
| 2004/0153952 A1 | 8/2004 | Sharma et al. |
| 2005/0044561 A1 | 2/2005 | McDonald |
| 2005/0125236 A1 | 6/2005 | Agapi et al. |
| 2008/0183975 A1 | 7/2008 | Foster et al. |
| 2008/0256143 A1* | 10/2008 | Reddy .................. G06F 3/0644 |
| 2009/0049260 A1 | 2/2009 | Upadhyayula |
| 2009/0300719 A1 | 12/2009 | Ferris |
| 2010/0031086 A1 | 2/2010 | Leppard |
| 2010/0146375 A1 | 6/2010 | Katz et al. |
| 2010/0235887 A1 | 9/2010 | Burch et al. |
| 2010/0299313 A1 | 11/2010 | Orsini et al. |
| 2011/0107103 A1 | 5/2011 | Dehaan et al. |
| 2012/0278622 A1 | 1/2012 | Lesavich et al. |
| 2012/0110346 A1 | 5/2012 | Resch |
| 2018/0204192 A1* | 7/2018 | Whaley .............. G06Q 20/0658 |

OTHER PUBLICATIONS

Written Opinion and International Preliminary Report on Patentability dated Feb. 5, 2019 for International Application No. PCT/US2017/04519.
International Search Report dated Dec. 7, 2017 for International Application No. PCT/US2017/045149.
Written Opinion of the International Searching Authority dated Dec. 6, 2017 for International Application No. PCT/US2017/045149.
Extended European Search Report dated May 3, 2018 for EP 15814481.6 (International Application No. PCT/US2015/038433).
Supplementary European Search Report dated Apr. 23, 2018 for EP 15814481.6 (International Application No. PCT/US2015/038433).
Written Opinion and International Preliminary Report on Patentability dated Jan. 3, 2017 for International Application No. PCT/US2015/038433.
Written Opinion of the International Searching Authority dated Dec. 3, 2015 for International Application No. PCT/US2015/038433.
International Preliminary Report on Patentability dated Feb. 5, 2019 for International Application No. PCT/US2017/045149.
International Search Report, dated Mar. 10, 2020, for corresponding PCT Application No. PCT/US2020/015664, International Filing Date Jan. 29, 2020, consisting of 2 Pages.
Written Opinion of the International Searching Authority, dated Mar. 10, 2020, for corresponding PCT Application No. PCT/US2020/015664, International Filing Date Jan. 29, 2020, consisting of 4 Pages.

\* cited by examiner

SYSTEMS AND METHODS FOR DIGITAL CURRENCY OR CRYPTO CURRENCY STORAGE IN A MULTI-VENDOR CLOUD ENVIRONMENT

CLAIM OF PRIORITY

This application is a continuation in part of and claims priority to U.S. patent application Ser. No. 16/055,587, filed Aug. 6, 2018, which is a Continuation of U.S. patent application Ser. No. 15/226,237, filed Aug. 2, 2016, now U.S. Pat. No. 10,043,017, which claims priority to U.S. patent application Ser. No. 14/251,612 filed Jun. 30, 2014, now U.S. Pat. No. 9,405,926, which claims priority to U.S. provisional application No. 61/812,115 filed Apr. 15, 2013, the disclosures of which are incorporated herein by reference in their entirety for any purpose whatsoever.

FIELD OF THE EMBODIMENTS

This invention relates to digital currency and crypto currency (collectively, "digital currency") protection and security in a cloud-based environment. In particular, the invention allows digital currency data to be stored in a cloud environment whereby it is inaccessible to any third party.

BACKGROUND OF THE EMBODIMENTS

With the advent of the internet, cyber security and data privacy is a growing global concern in today's world. Information technology and electronic discovery advances in a variety of industries, including the legal industry have compounded the issue. The United States and many foreign countries have enacted strict and stringent requirements on data privacy and security. Global entities and multinational corporations have struggled to comply with local data privacy laws. Data privacy laws define how companies and individuals must store and manage computer data. However, the laws are complex and sometimes the laws of one jurisdiction are in direct conflict with the laws of another jurisdiction. This has caused companies to give much thought as to how and where it stores their protected data. Because of the evolution of technology, companies are migrating away from managing and storing data internally, and opting instead to store data with a third party. The third party provider provides the physical infrastructure and maintains the data for a large number of customers. This scenario is generally known as the "cloud" or a virtual storage system. Such cloud-based systems are used by many companies, but each is maintained by a single cloud service provider or "cloud vendor".

The development of the cloud has introduced many new challenges for companies. Customers are unclear as to what jurisdiction contains their inactive digital data (i.e. data at rest), since a cloud customer does not know where a cloud vendor maintains its actual physical infrastructure. Other challenges involve data security. Cloud environments can be compromised by hackers or by a company's internal employees ultimately leading to an organization's data being accessed or transferred. If the data is sensitive, such as personally identifiable information ("PIT"), the company may be required to make a mandatory disclosure to its customers. In some cases, the company is not aware of such an invasion, and thereby may not make the disclosure they are required to make. In addition, a cloud vendor may go offline or go out of business, thereby creating a potential situation where a subscriber cannot access its own data. The present invention solves many of these and other challenges.

The present invention relates to a cloud-based system including the creation of a system which causes computer data to be redundant and jurisdiction independent. In the present application, a data file is segmented and encrypted wherein each data file segment is striped across multiple cloud service providers. Thus, in the event each cloud service provider maintains physical storage in a different jurisdiction, then each encrypted segment will be at rest in a different jurisdiction. Therefore, each encrypted segment contains no readable data on its own, and must be reassembled with its other segments before the whole can be decrypted. Only once the segments from different jurisdictions are assembled can it be decrypted and read. The disclosed system enables a data file to be jurisdictionally independent until it is reassembled, and once the data is reassembled will it be able to be governed. The present application enables a company to subscribe to many cloud vendors, and not have to worry about their data at rest. For example, during the legal discovery process, a company can choose the jurisdiction for data production simply by reassembling its data in that jurisdiction.

SUMMARY OF THE EMBODIMENTS

According to an aspect of the present invention, a cloud-based system for secure storage of digital currency or crypto currency (hereinafter, collectively, "digital currency") is provided. The system includes a processor, the processor being configured to: create a source digital currency data file; and split the source digital currency data file into one or more fragments. The system further includes an encryption key associated with the one or more fragments, wherein the one or more fragments are encrypted by the encryption key, and a plurality of cloud storage providers, wherein the one or more fragments are distributed among the plurality of cloud storage providers, whereby no single cloud storage provider in the plurality of cloud storage providers possesses all of the one or more fragments. The system additionally includes a pointer file which is created on a local computer, wherein the pointer file is configured to store a location of the one or more fragments, and wherein the processor is further configured to: access the pointer file; authenticate the plurality of cloud storage providers using the encryption key; transfer the one or more fragments from the plurality of cloud storage providers to the local computer; reassemble the one or more fragments; and delete the source digital currency data file.

It is an object of the present invention to provide the cloud-based system for secure storage of digital currency, wherein the encryption key is generated by the user.

It is an object of the present invention to provide the cloud-based system for secure storage of digital currency, wherein the processor is further configured to autogenerate the encryption key.

It is an object of the present invention to provide the cloud-based system for secure storage of digital currency, wherein the pointer file is stored locally on a user's computer.

It is an object of the present invention to provide the cloud-based system for secure storage of digital currency, wherein the pointer file further includes a lookup table.

According to another aspect of the present invention, a computer implemented method for secure storage of digital currency or crypto currency (hereinafter, collectively, "digital currency") is provided. The method includes creating, via a processor, a source digital currency data file, splitting, via the processor, the source digital currency data file into one or more fragments, associating, via the processor, an encryption key with the one or more fragments; encrypting, via the processor, the one or more fragments by the encryption key, and distributing, via the processor, the one or more fragments among a plurality of cloud storage providers, whereby no single cloud storage provider in the plurality of cloud storage providers possesses all of the one or more fragments. The method further includes creating a pointer file on a local computer, wherein the pointer file is configured to store a location of the one or more fragments; storing the location of the one or more fragments, accessing the pointer file, authenticating, via the processor, the plurality of cloud storage providers using the encryption key, transferring, via the processor, the one or more fragments from the plurality of cloud storage providers to the local computer, reassembling, via the processor, the one or more fragments, and deleting the source digital currency data file.

It is an object of the present invention to provide the computer implemented method for secure storage of digital currency, wherein the method further includes generating, via the processor, a copy of the pointer file.

It is an object of the present invention to provide the computer implemented method for secure storage of digital currency, wherein the method further includes encypting the copy of the pointer file.

It is an object of the present invention to provide the computer implemented method for secure storage of digital currency, wherein the method further includes accessing the encrypted pointer file on one or more secondary computers, and decrypting the encrypted pointer file.

DESCRIPTION OF THE PREFERRED EMBODIMENTS

Figure 1:
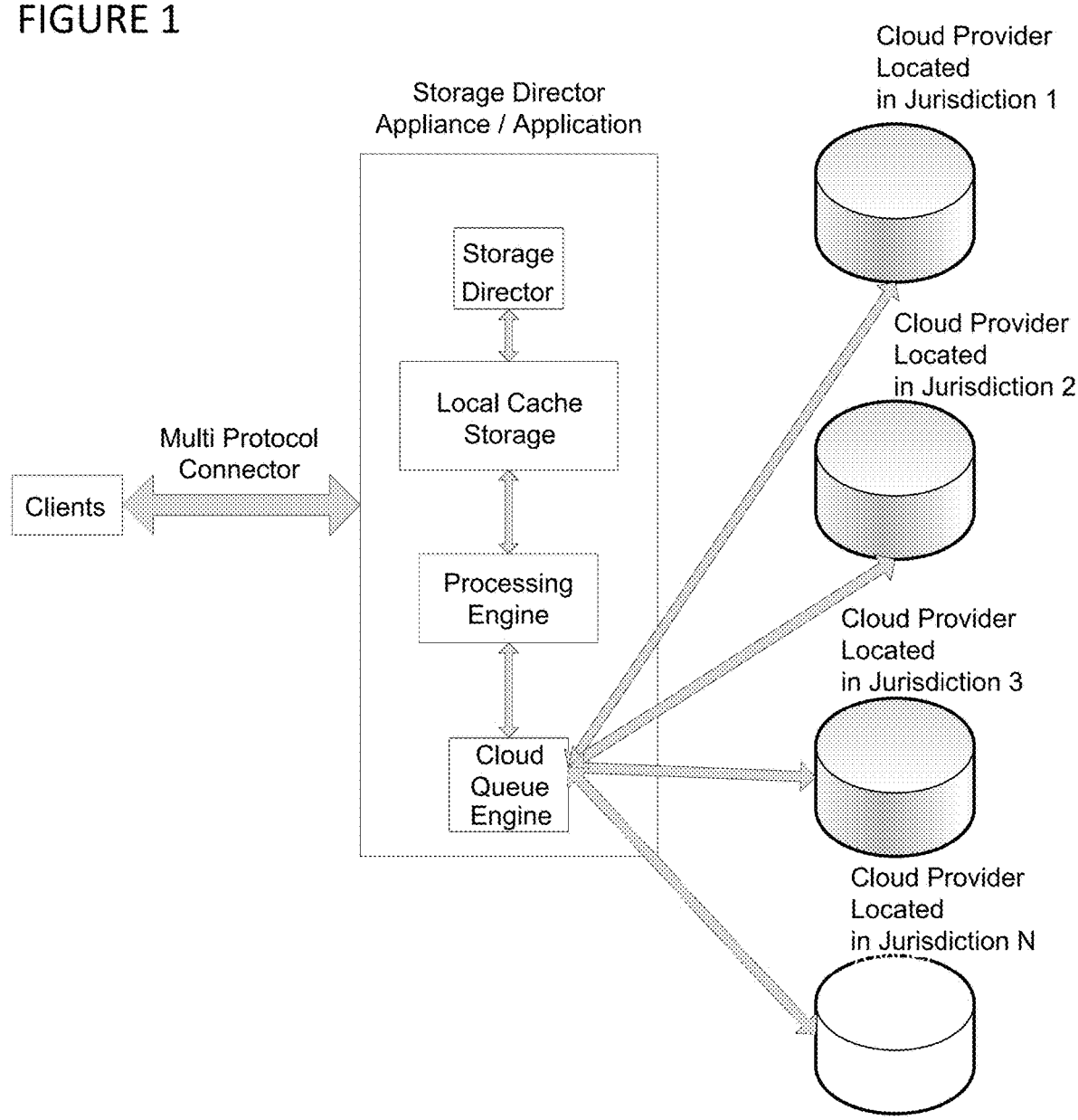
FIG. 1 shows the preferred embodiment of the system of the invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

FIG. 1 shows the process flow of data through the cloud-based system of the present application. The process commences with a native data file, the data file is encrypted and broken into segmented parts, and the segmented data file is then forwarded to multiple cloud storage providers located in multiple jurisdictions. A client (or multiple clients) connects to a Storage Director Appliance or Software Application through a Multi-Protocol Connector. The multi-protocol connector may be via a web browser through the Internet. The Storage Director Appliance or Application has the ability to locally store a cached file in a local cache storage. The file is processed by a processing engine where it is encrypted and separated into "n" parts. Each of the parts are passed on to the Cloud Queue Engine, which transmits and deposits the segmented parts to multiple Cloud Providers located in multiple legal jurisdictions. When the file is requested by an authorized user, The Cloud Queue Engine retrieves a copy of each of "n" parts, downloads them to the Storage Director Appliance or Application, and processes the Segmented parts to re-create the original encrypted file. The encrypted file is decrypted, and the native file becomes available to the user.

Figure 2:
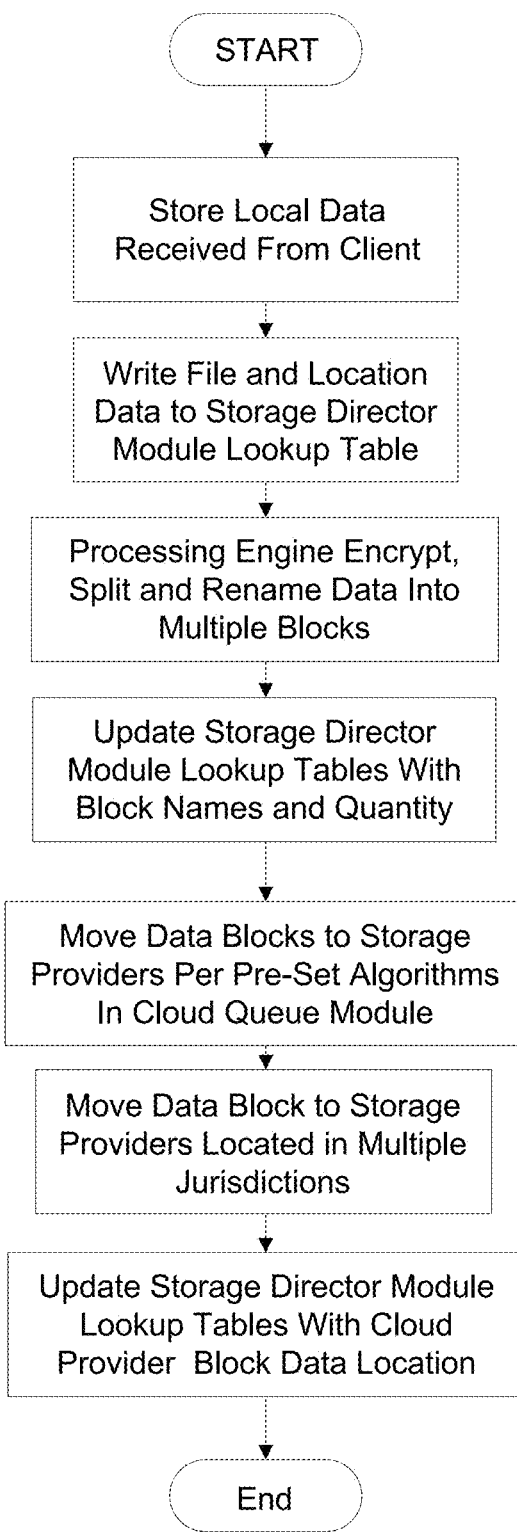
FIG. 2 show the preferred method of the invention.

FIG. 2 shows a flow chart diagram that describes the process of taking a native file and securely storing it in one of multiple cloud vendors located in more than one jurisdiction. To reassemble the file, the process is simply reversed. In step 1, local or native data is received from a Client and ready for processing. In step 2, the file and location data are written to the Storage Director module Lookup Table. In step 3, the file is processed by the Processing Engine, where it is encrypted. The encrypted file is then broken into multiple data blocks, and each block is assigned a unique name or identifier. In step 4, the Storage Director module Lookup table is updated with the block name of each data block and the total Quantity of blocks that were created from the original encrypted file. In steps 5 the data blocks are Forwarded and moved to storage providers as per a preset algorithm as instructed by the Cloud Queue Engine or Module. In step 6, the blocks are forward and moved to one of multiple cloud storage providers which are located in multiple jurisdictions as instructed by the Cloud Queue Engine or Module. The blocks are stored at cloud providers located in different jurisdictions. In step 7, the Storage Director module lookup table is updated with the data location of each block at each Cloud Provider.

Figure 3:
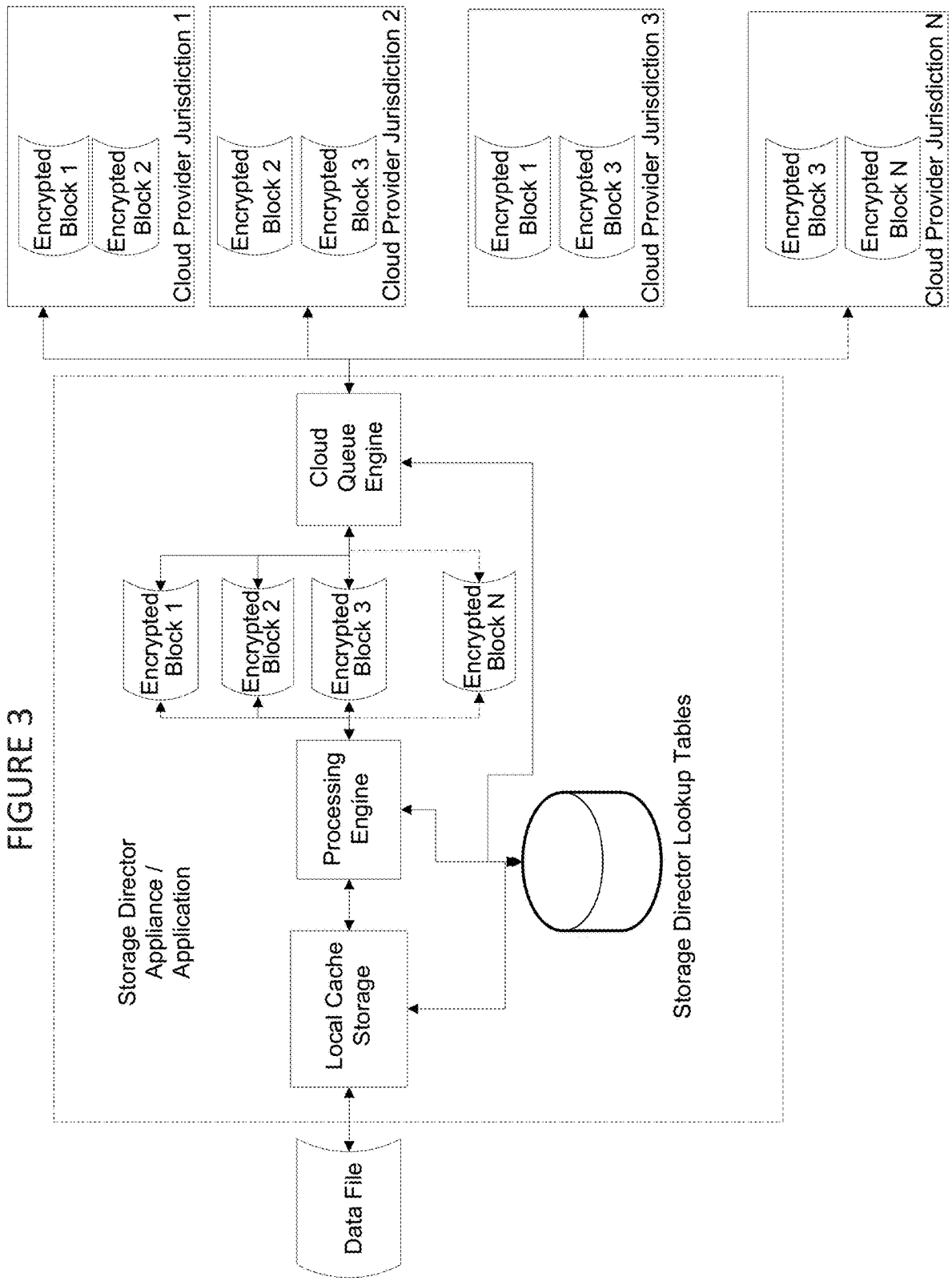
FIG. 3 shows a graphical representation of the flow of a data file and data blocks in the system.

In FIG. 3, a graphical representation of the data flow is shown. FIG. 3 also illustrates how data blocks are securely and redundantly stored across Cloud Providers in "n" jurisdictions. Once a native data file is encrypted and broken into data blocks by the Storage Director Appliance or Application, the Cloud Queue Engine or module distributes the blocks to "n" Cloud Providers in "n" legal jurisdictions. Each data block is written to two or more Cloud Providers, which "stripes" the data across multiple providers in varying jurisdictions. If a given Cloud Provider is compromised by going offline and unavailable, the Cloud Queue Engine can still retrieve the data blocks from another Cloud Provider. In addition, if a given Cloud Provider is compromised by a hacker or unauthorized user, the data blocks that may have been compromised are of no value to the hacker, because the hacker will only be in possession of encrypted blocks, and not any entire file.

The present embodiments relate to systems and methods for secure data storage in a multi-vendor cloud environment in a manner that prevents the third party cloud provider from being able to access or be in possession of complete data files. The computer or device that creates the source data distributes only a portion of a data file to each of a plurality of cloud storage providers. The source computer or device maintains a lookup table and is able to re-assemble the data. Each storage provider only maintains part of each data file, and therefore is never in possession of any complete data file(s). The source computer or device can retrieve each portion of the file from multiple cloud providers, whereby the portions are re-assembled into the complete data file by using the lookup table. The system allows for large amounts of data to be stored across a plurality of third party cloud storage providers in a manner that prevents any third party from having access to any complete file. The data is distributed globally among a plurality of cloud storage providers. No single cloud provider has access to any complete file, as each file is broken into Encrypted segments or data blocks and only one Data block is sent to each cloud provider. Each cloud provider is in a different physical location across multiple jurisdictions. As a result, the file does not exist at rest in any one jurisdiction, thus is not subject to legal and/or regulatory requirements of any single jurisdiction while it is stored in a multi-vendor cloud environment.

The system ensures that any data file stored in a multi-vendor cloud environment in this manner cannot be subject to the laws governing production of, privacy of, or protection of data in any jurisdiction.

In another embodiment, a system and method for securely sharing data files by using a multi-vendor cloud environment in a manner that prevents any third party from being able to access or be in possession of the original source data file is taught. The computer or device that creates the source data splits each file into multiple segments. Each segment is then encrypted using an encryption key defined by the user. Each of the encrypted fragments are then distributed to multiple cloud properties whereby only a portion of the fragments of the source data file is stored to any one of a plurality of cloud storage providers. The source computer or device maintains a pointer file that contains a lookup table and is able to re-assemble the data if it knows the encryption key and has access to the same cloud properties. Each storage provider only maintains part of each data file, and therefore is never in possession of any complete data file(s). Any computer or device that has possession of the pointer file, knows the encryption key, and has access to the cloud provider storage can retrieve each portion of the file from multiple cloud providers, whereby the portions are downloaded, decrypted using the user generated encryption key stored in the pointer file, and re-assembled into the complete data file by using the lookup table. The system allows for large amounts of data to be stored across a plurality of third party cloud storage providers in a manner that prevents any third party from having access to any complete file. The data is safe from being exploited or hacked by any third party, since even if all cloud providers are breached, the data cannot be re-assembled without the encryption key and the lookup table.

In this embodiment, the method comprises; a source data file is created, the source data file is split into fragments; an encryption key is created by the user; each fragment is encrypted using the encryption key; the fragments are distributed in multiple cloud storage providers, whereby no single cloud storage provider is in possession of all fragments; a pointer file is created that stores the location of each fragment; the pointer file is stored locally, and the original file is deleted. The user is able to open the pointer file, enter the encryption key, and authenticate to the cloud storage providers. Each fragmented is transferred from the cloud storage providers to the local computer. The fragments are re-assembled locally on the computer.

In another embodiment, a system and method for securely sharing data files by using a multi-vendor cloud environment in a manner that prevents any third party from being able to access or be in possession of the original source data file is taught. The computer or device that creates the source data splits each file into multiple segments. Each segment is then encrypted using an encryption key defined by the user. Each of the encrypted fragments are then distributed to multiple cloud properties whereby only a portion of the fragments of the source data file is stored to any one of a plurality of cloud storage providers. The source computer or device maintains a pointer file that contains a lookup table and is able to re-assemble the data if it knows the encryption key and has access to the same cloud properties. The pointer file can be freely shared with other users using any data transmission method, including email, copy/paste, etc. Each storage provider only maintains part of each data file, and therefore is never in possession of any complete data file(s). Any computer or device that has possession of the pointer file, knows the encryption key, and has access to the cloud properties can retrieve each portion of the file from multiple cloud providers, whereby the portions are downloaded, decrypted using the user generated encryption key stored in the pointer file, and locally re-assembled into the complete data file. The system allows for large amounts of data to be stored across a plurality of third party cloud storage providers in a manner that prevents any third party from having access to any complete file, unless the source user shares the pointer file, encryption key, and access to the cloud properties. The data at rest is safe from being exploited or hacked by any third party, since even if all cloud providers are breached, the data cannot be re-assembled without the pointer file, encryption key, and access to a complete set of fragments.

In this embodiment, the method comprises: a source data file is created; the source data file is split into fragments; an encryption key is created by user #1; each fragment is encrypted using the encryption key; the fragments are distributed in multiple cloud storage providers, whereby no single cloud storage provider is in possession of all fragments; a pointer file is created that stores the location of each fragment; the pointer file is stored locally, and the original file is deleted. The pointer file is shared with user #2. User #2 is able to access the fragments stored at the cloud storage providers; User #2 has knowledge of the encryption key; User #2 is able to open the pointer file, enter the encryption key, and authenticate to the cloud storage providers. Each fragmented is transferred from the cloud storage providers to the local computer of user #2. The fragments are re-assembled locally on the computer of user #2.

The advantages and features of the application are of a representative sample of embodiments only, and are not exhaustive and/or exclusive. They are presented only to assist in understanding and teach the claimed principles. It should be understood that they are not representative of all disclosed embodiments. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims. It is to be understood that, depending on the particular needs and/or characteristics of a individual and/or enterprise user, database configuration and/or relational model, data type, data transmission and/or network framework, syntax structure, and/or the like, various embodiments of the system may be implemented that enable a great deal of flexibility and customization.

Figure 4:
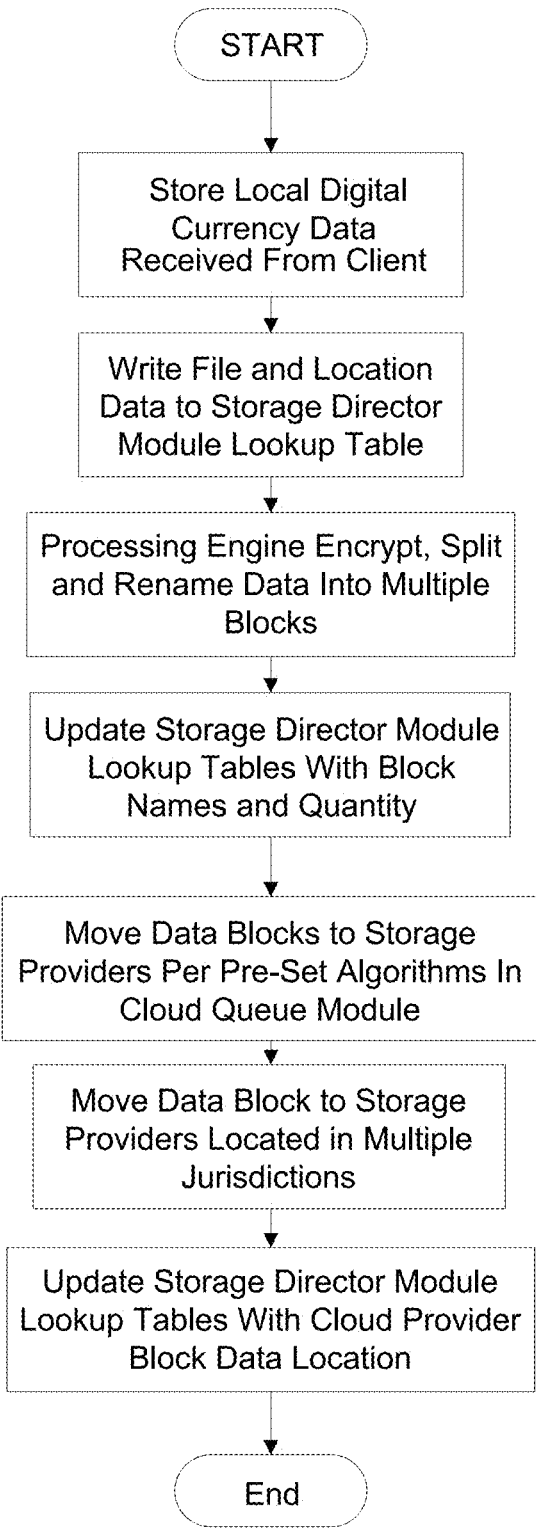
FIG. 4 shows an alternative method of the invention.

In another embodiment, the cloud-based system (as shown in FIG. 4) is configured to securely store digital currency. According to an embodiemtn, the system is configured such that the digital currency is at rest across publicly available network clouds. According to an embodiment, the system provides data security and has a processor which creates a source digital currency data file. The source data file is split into one or more fragments.

According to an embodiment, the system generates an encryption key associated with the one or more fragments, wherein the one or more fragments are encrypted by the encryption key. According to an embodiment, the system further includes a plurality of cloud storage providers, wherein the one or more fragments are distributed among the plurality of cloud storage providers, whereby no single cloud storage provider possesses all of the one or more fragments According to an embodiment, a pointer file is created on a local computer, wherein the pointer file is configured to store the location of the one or more fragments, and wherein the pointer file is accessed. According to an embodiment, the encryption key authenticates the plurality of cloud storage providers and the one or more fragments are then transferred from the plurality of cloud storage providers to the local computer, wherein the one or more fragments are reassembled. Once reassembled, the source data file is deleted, further increasing the security over the digital currency files.

All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Descriptions herein of method steps and computer programs represent conceptual embodiments of illustrative circuitry and software embodying the principles of the disclosed embodiments. Thus the functions of the various elements shown and described herein may be provided through the use of dedicated hardware as well as hardware capable of executing software in association with appropriate software as set forth herein.

In the disclosure hereof any element expressed as a means for performing a specified function is intended to encompass any way of performing that function including, for example, a) a combination of circuit elements and associated hardware which perform that function or b) software in any form, including, therefore, firmware, microcode or the like as set forth herein, combined with appropriate circuitry for executing that software to perform the function. Applicants thus regard any means which can provide those functionalities as equivalent to those shown herein.

Similarly, it will be appreciated that the system and process flows described herein represent various processes which may be substantially represented in computer-readable media and so executed by a computer or processor, whether or not such computer or processor is explicitly shown. Moreover, the various processes can be understood as representing not only processing and/or other functions but, alternatively, as blocks of program code that carry out such processing or functions.

The methods, systems, computer programs and mobile devices of the present disclosure, as described above and shown in the drawings, among other things, provide for improved social networking platforms and aspects thereof. It will be apparent to those skilled in the art that various modifications and variations can be made in the devices, methods, software programs and mobile devices of the present disclosure without departing from the spirit or scope of the disclosure. Thus, it is intended that the present disclosure include modifications and variations that are within the scope of the subject disclosure and equivalents.

What is claimed is:

1. A cloud-based system for secure storage of digital currency or crypto currency (hereinafter, collectively, "digital currency"), comprising:
   a processor configured to:
      obtain source digital currency;
      split the source digital currency into a plurality of data blocks;
      encrypt the data blocks using an encryption key associated with the data blocks; and
      write the encrypted data blocks across at least three cloud storage providers, each cloud storage provider located in a different legal jurisdiction, each data block written to at least two but less than all of the cloud storage providers, whereby there is no single cloud storage provider to which all of the data blocks are written; such that if any one cloud storage provider is unavailable, the encrypted data blocks stored thereon may be retrieved from at least one other cloud storage provider; and in the case any one of the cloud storage providers is compromised, the digital currency cannot be recovered from the encrypted data blocks stored in that cloud storage provider alone;
      create a pointer file;
      store in the pointer file the locations in every cloud storage provider to which each of the encrypted data blocks was written; and
   the processor is further configured to thereafter:
      access the pointer file and the encryption key;
      authenticate, using the encryption key, the cloud storage providers in which the encrypted blocks were written;

transfer the encrypted blocks from the cloud storage providers to a secondary computer;

decrypt the transferred encrypted blocks;

reassemble the decrypted blocks as digital currency; and delete the source digital currency.

2. The system as recited in claim 1, wherein the encryption key is generated by a user.

3. The system as recited in claim 1, wherein the processor is further configured to autogenerate the encryption key.

4. The system as recited in claim 1, wherein the pointer file is stored locally on a user's computer.

5. The system as recited in claim 1, wherein the pointer file further includes a lookup table.

6. A computer implemented method for secure storage of digital currency or crypto currency (hereinafter, collectively, "digital currency"), comprising causing by a processor completion of steps including:

obtaining source digital currency;

splitting the source digital currency into a plurality of data blocks;

encrypting the data blocks using an encryption key associated with the data blocks;

writing the encrypted data blocks across at least three cloud storage providers, each cloud storage provider located in a different legal jurisdiction, each data block written to at least two but less than all of the cloud storage providers, whereby there is no single cloud storage provider to which all of the data blocks are written; such that if any one cloud storage provider is unavailable, the encrypted data blocks stored thereon may be retrieved from at least one other cloud storage provider; and in the case any one of the cloud storage providers is compromised, the digital currency cannot be recovered from the encrypted data blocks stored in that cloud storage provider alone;

creating a pointer file;

storing in the pointer file the locations in every cloud storage provider to which each of the encrypted data blocks was written; and thereafter:

accessing the pointer file and the encryption key;

authenticating, using the encryption key, the cloud storage providers in which the encrypted blocks were written;

transferring the encrypted blocks from the cloud storage providers to a secondary the local computer;

decrypting the transferred encrypted blocks;

reassembling the decrypted blocks as digital currency; and deleting the source digital currency.

7. The method as recited in claim 6, further comprising: generating, via the processor, a copy of the pointer file.

8. The method as recited in claim 7, further comprising: encrypting the copy of the pointer file.

9. The method as recited in claim 8, further comprising: accessing the encrypted pointer file on one or more secondary computers; and decrypting the encrypted pointer file.

\* \* \* \* \*